United States Patent Office 2,698,799
Patented Jan. 4, 1955

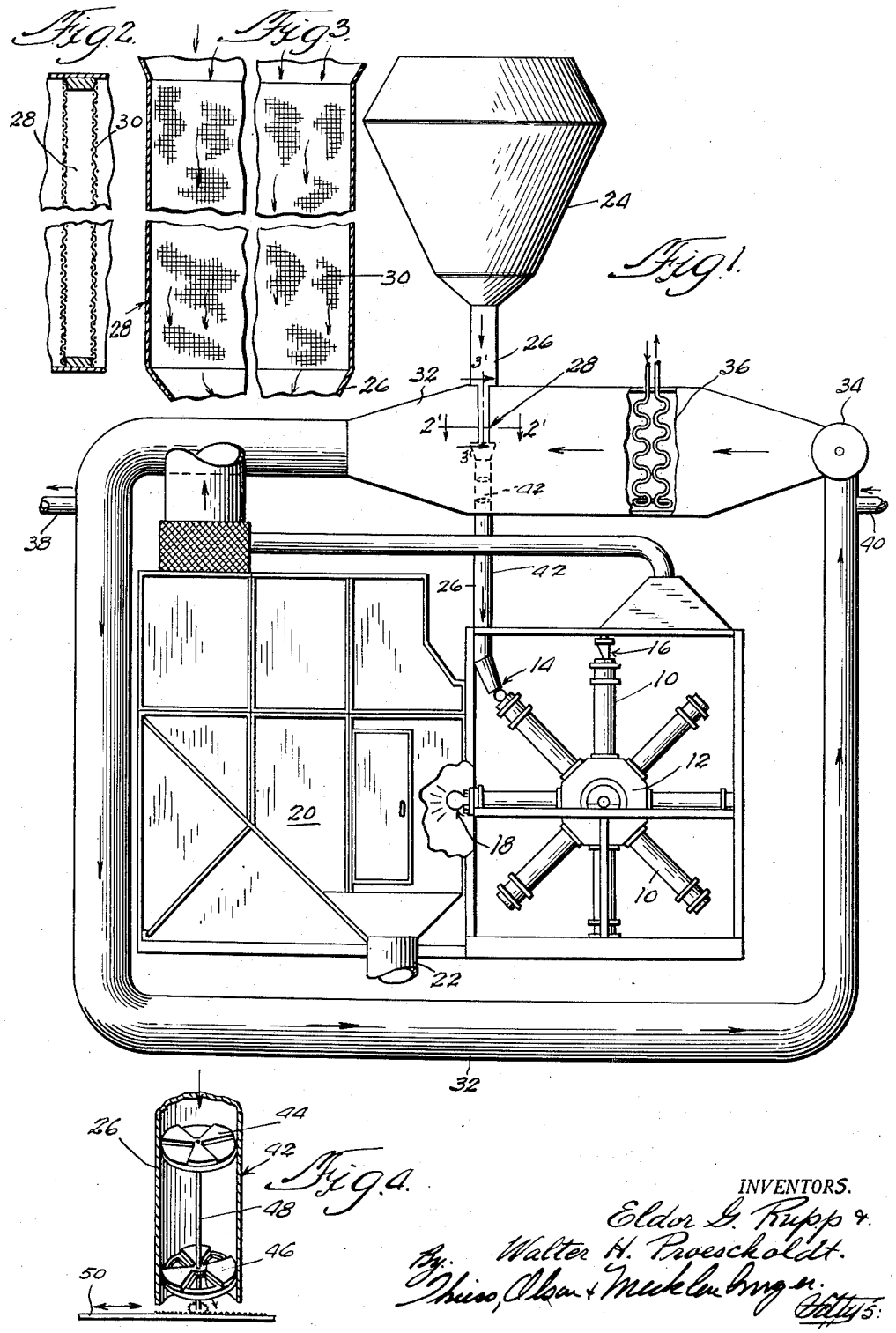

2,698,799

METHOD FOR PUFFING CEREALS

Eldor G. Rupp, Clarendon Hills, and Walter H. Proescholdt, Western Springs, Ill., assignors to The Quaker Oats Company, Chicago, Ill., a corporation of New Jersey Application June 2, 1950, Serial No. 165,764

7 Claims. (Cl. 99—82)

This invention relates to methods and apparatus for puffing cereal grains and has for a particular object the provision of a method and apparatus for puffing wheat.

In the past it has been common practice to puff cereal grains, such as wheat, rice, corn and the like, by means of an explosion process in which the grains are introduced into a pressure chamber or gun having a suddenly releasable closure device at one end thereof. In accordance wih some prior practices, a grain such as wheat is introduced into the gun or chamber and the grain is pre-cooked with steam under pressure for a predetermined time. After this preliminary cooking treatment, the steam pressure is released by bleeding over a period of about ten seconds. Thereafter steam is again injected into the gun to build up a desired puffing pressure after which the pressure is suddenly released by opening the closure device whereby the grains are puffed and shot through the open end of the gun into a suitable receptacle. While substantial quantities of wheat have been puffed commercially by such a process, there are certain disadvantages that are inherent in the method. For example, in commercial operations utilizing this method the losses (which are primarily due to insufficient puffing) may run up to about 7 per cent. Also it has been found that the time and conditions of precooking the grains are critical for each batch of grain processed, thereby resulting in some lack of uniformity in the product produced unless extreme care is observed. Apparatuses in which the above described general process may be carired out are those disclosed in Plews Patent No. 2,116,212 and Andrews Patent No. 2,414,185.

Another method which has been extensively used in the commercial puffing of cereal grains such as wheat is the so-called Quaker method employing a gun of the general character disclosed in Warren Patent No. 2,261,456. In accordance with this process a charge of grain such as wheat is introduced into a cylindrical puffing gun which is mounted for rotation within a gas furnace. After the wheat has been introduced, the gun is sealed and is preheated in the furnace fired to a temperature of between about 850° and about 950° F. The gun is rotated during this treatment to prevent the grains from scorching and any pressure that may accumulate on account of the moisture within the grain during this heating step is allowed to be built up within the gun. After heating for a specified time, the pressure is released by bleeding over a period of about ten seconds. Steam is then injected into the gun to build up a puffing pressure. Thereafter the end closure member is released suddenly to produce the desired puffed product. This particular type of gun has found extensive commercial use and produces a very satisfactory product. Nevertheless there is some loss due to insufficient expansion upon puffing and due to burning or scorching of certain of the cereal grains in the high temperature pretreatment before expansion.

Accordingly it is one object of this invention to provide a method and apparatus for puffing cereal grains in which losses due to insufficient puffing or scorching are materially reduced.

A further object of this invention is the provision of a puffed product, particularly wheat, which has a volume greater than the usual product produced by prior commercial operations.

A still further object of this invention is the provision of a process and apparatus in which the puffed product obtained therefrom is uniform.

A still further object of this invention is the provision of a puffing process and apparatus for cereal grains in which it is not necessary separately to precook the grains within the gun prior to the final pressurizing and puffing step.

Further and additional objects will appear from the following description, the accompanying drawing and the appended claims.

In accordance with one embodiment of this invention, and in order to achieve the stated objects, a cereal grain such as wheat is first heated under dry heat to an elevated temperature and thereafter the heated wheat, without substantial cooling, is introduced into a preheated pressure gun. The pressure gun is then sealed and while it and the grain are still hot there is introduced steam under pressure which is maintained for the usual length of time whereafter the closure of the gun is suddenly released, causing the grains to puff and to be shot into a suitable collecting chamber. An important feature of this invention is the provision of a process and apparatus in which the cereal grains, particularly those of wheat, are preheated to a temperature above about 212° F., preferably between about 220° and about 320° F., under drying conditions whereby the normal moisture content of the grain is reduced to a value preferably not lower than about 6 per cent. After the cereal grains have been so heated and thus partially dehydrated, then they are introduced into a puffing gun or chamber which has been preheated from a previous puffing operation and under conditions such that the heated grains prior to the puffing operation are not allowed to cool to a temperature below about 212° F.

The preheating of the grain under drying conditions may be effected in any desired manner but it is preferred to be done by passing a stream of heated air through the grain for a time and at a temperature sufficient to impart the desired heat without lowering the moisture content below about 6 per cent by weight. This may be effected by passing the hot air transversely through a descending compact column of grain confined between a pair of spaced foraminous sheets.

For a more complete understanding of this invention, reference will now be made to the accompanying drawing, in which Fig. 1 is a schematic view of a device or apparatus embodying this invention and in which the process of this invention may be carried out;

Fig. 2 is a broken and enlarged detail sectional view taken along the line 2'—2' of Fig. 1;

Fig. 3 is also a broken and enlarged detail sectional view taken along the line 3'—3' of Fig. 1; and Fig. 4 is an enlarged detail perspective view partially in section of a device for measuring the grain to be charged to the device shown in Fig. 1.

A puffing gun which is particularly adapted for use in connection with the novel process and apparatus of this invention is a modified form of that disclosed in Andrews Patent No. 2,414,185 and Fig. 1 of the attached drawings shows a schematic view of a multiple gun of the type disclosed in the Andrews patent to which the process and apparatus of this invention have been adapted. Generally speaking, the Andrews gun comprises a plurality of pressure chambers 10 mounted on a revolving drum or turret 12. The turret may be intermittently revolved successively to position the ends of each pressure chamber adjacent a charging station 14, a chamber closing station 16 and an explosion or puffing station 18. At the puffing station 18 there is provided means (not shown) for suddenly releasing the pressure within each of the pressure chambers whereby the cereal grain is explosively puffed and simultaneously discharged into a collection chamber 20 from which the exploded product is withdrawn through a conduit 22. Suitable steam inlet connections (not shown) are provided in the turret or drum 12 so that after the expansion chambers 10 are closed at station 16 steam is passed into each of the chambers 10 as the turret is rotated. The steam outlet conduits shown in the Andrews patent for bleeding steam from the chambers prior to the final pressurizing step have been closed off in the practice of the herein described embodiment of this invention so that the steam introduced into each of the chambers 10 is released into the collecting chamber only when the explosive puffing step is effected at station 18.

In accordance with the present invention the cereal grains, such as wheat, are heated to an elevated temperature above about 212° F. prior to the time that the wheat or other grain is charged into each puffing chamber 10 at station 14. This heating in the apparatus shown in the drawing is effected by charging the wheat or other grain to be puffed into a hopper 24 having a depending conduit 26 which periodically discharges at station 14 into the end of the puffing chambers 10 which are open at this point. The discharge conduit 26 includes a heating zone or section 28 including a pair of substantially parallel spaced-apart wall elements 30 which are foraminous in nature and may comprise fly screens or other suitable reticulate or perforate sheet material. These screens or other foraminous wall elements 30 traverse a hot gas duct 32 through which a hot gas such as air may be circulated by means of a fan or blower 34. If desired, a transverse partition (not shown) may be provided in the duct 32 below the lower edge of the heating section 26 to insure that all or a substantial portion of the air is forced through the section 28 between the wall elements 30. Steam coils or other heating means 36 are employed to heat the air in the duct. Thus cereal grains are passed downwardly in a solid compact column through the heating zone 28 between the spaced foraminous sheets 30 and a current of hot air or other gas is simultaneously passed through the foraminous sheets and the column of grain in the heating zone. The hot air duct is provided with conduits 38 and 40 for withdrawing gas from and adding fresh gas to the circulating system as may be desired.

In order that the amount of grain to be charged to each puffing chamber 10 may be readily controlled, there is provided a measuring device 42 in a section of conduit 26 also positioned within the hot air duct 32. This measuring device (Fig. 4) comprises a pair of spaced dampers 44 and 46 mounted for simultaneous operation on a single shaft 48 in such a manner that when a lever 50 is reciprocated, the damper 44 will rotate to close the conduit 26 at the point where it is located and the damper 46 will rotate to open the conduit 26 at the point where it is located. Thus when damper 44 is open, damper 46 is closed and vice versa. The space between the two dampers 44 and 46 determines the amount of grain that is to be included in each charge to the pressure dampers 10.

In one particular form of the device the volume of the space between the dampers 44 and 46 in the conduit 26 is such that a charge of about 5¾ pounds of wheat is added to each pressure chamber in each cycle of the operation. Each pressure chamber 10 is cylindrical in form and has a diameter of 3 inches and a length of about 24 inches. The heating zone 28 through which the solid column of wheat grains descends is 30 inches high, 18 inches wide and about 2 inches thick.

In one operation the steam coils 36 contained steam at 130 pounds per square inch pressure and the average time that each grain remained within the heating zone 28 was about 4 minutes. The rate of flow of hot air through the duct 32 was controlled so that the temperature of the grain at the poin of discharge from the heating zone ranged between about 290° and 315° F.

It will be apparent from the foregoing description that a process and apparatus have been provided for imparting a dry heat to the grain by passing hot air thereover prior to the time that the grain is discharged into the puffing chamber 10. When employing this process it has been found that the normal water content of the grain is reduced from a normal of about 10 to 12 per cent to about 7½ to about 8 per cent by weight. While further dehydration may be achieved by heating for a longer period, it is preferred that such heating be discontinued before the moisture content of the grain passing to the gun is less than about 6 per cent by weight. If the moisture content is less than this value when practicing the process of this invention, the expansion and color of the product are good upon puffing but the product is considered commercially unsatisfactory because of its brittleness. The temperature to which the grain is heated in the heating zone 28 should be above about 212° F. and below about 350° F. The product is not acceptable if not pretreated to at least 212° F. and at the higher temperatures the contact time should, of course, be controlled so that no substantial scorching or discoloration of the grain will occur as it passes through the heating zone. Generally speaking, and in the case of wheat, it is preferred that the temperature obtained within the heating zone should be within the range of about 220° F. and about 320° F. It is also important to note that the heated grain is fed to each pressure chamber 10 while it is still hot and the temperature thereof should not be allowed to cool below about 212° F. or preferably below about 220° F. Furthermore, it is pointed out that the pressure chamber itself does not exert a cooling effect on the grain prior to the time that the chamber is sealed for puffing because the chamber has in effect been preheated by an immediately preceding puffing operation. Of course, this temperature will ordinarily be above about 212° F.

After the hot grain has been introduced into each chamber 10 at station 14 from the measuring device 42, then the turret 12 is rotated to close that chamber 10 at station 16 while the next following chamber 10 is being loaded at station 14, all as will be readily apparent upon consideration of the disclosure in the Andrews patent. Then as each chamber progresses from station 16 to the explosion station 18 steam is passed into the chamber to build up within the chamber a suitable pressure for the final puffing operation. The steam pressure obtaining at the time of the puffing operation is satisfactorily about 215 pounds per square inch and the pressurizing cycle of each chamber is about 3 minutes.

The preheating step under drying conditions as disclosed herein considerably reduces the losses that are ordinarily obtained in commercial puffing operations. For example, by the practice of the preheating step of this invention, puffing losses have been reduced from 7 to about 3½ per cent. Furthermore, the product of this improved process is very uniform and has an increased volume. Likewise, by practicing this invention the usual precooking step is eliminated and this is a decided advantage because the precooking step is quite difficult to control in order to produce good puffing efficiency for various batches of wheat or other grain. Also by providing a readily controlled outside means for dry heating the grain prior to passing into the puffing chamber the tendency to scorch or burn the product may be controlled so as to be practically eliminated. It will be noted that the grain measuring device 42 is located within the hot air duct 32 so that the temperature of the grain therein will be maintained until it is discharged into a puffing chamber.

In the foregoing description this invention has been described particularly with reference to the multiple type gun of the general character disclosed in Andrews Patent No. 2,414,185. However, this invention is not to be limited in its use to guns of this particular type since the broad invention finds application for use in many types of puffing guns. While a particular method of preheating the cereal grains has been disclosed, it will be apparent that other means may be employed, for example, the grains may be passed through a toasting oven of the usual type whereby they are heated to the desired temperature specified above, care being taken not to scorch or otherwise discolor the grains being treated. Thereafter the thus toasted grains may be immediately charged while still hot to a suitable puffing gun which may be of the multiple type or of the type disclosed in Plews Patent No. 2,116,212 or Warren Patent No. 2,261,456.

As indicated previously, this invention finds particular application in the puffing of wheat grains. However, in its broader aspects the invention finds use in the puffing of other cereal grains, such as rice, corn and the like.

The reasons why the process of this invention is capable of producing a product having improved properties is not entirely clear and no attempt will be made to explain the phenomenon. Preliminary experiments would seem to indicate that there is no necessary correlation between the improvement noted and the amount of water that may have been removed from the grain by the drying process except that the water should not be removed to less than about 6 per cent by weight on account of resulting brittleness in the product. Preliminary experiments, moreover, would seem to indicate that the improved results noted are in some way connected with preventing the condensation of any water on the grain within the expansion gun or chamber prior to the puffing operation.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for puffing cereal grains which comprises passing a heated drying gas through a mass of said grains whereby to heat said grains to a temperature between about 212° F. and about 350° F. for a time insufficient substantially to scorch or discolor said grains, discharging said grains without cooling to a temperature substantially below about 212° F. to a steam puffing zone, and then explosively puffing the grains.

2. A process for puffing wheat grains which comprises heating the grains to a temperature between about 212° F. and about 350° F. in the presence of a drying gas for a time insufficient substantially to scorch or discolor said grains, discharging said heated grains at a temperature above about 212° F. to a preheated puffing zone, sealing said zone, introducing steam under pressure into said zone, and suddenly releasing the steam pressure within said zone whereby said puffing is effected.

3. The process recited in claim 2 wherein the grains are heated by said drying gas to a temperature between about 220° F. and about 320° F.

4. A process for puffing wheat grains which comprises passing said grains by gravity through a heating zone, passing a hot drying gas through said zone, discharging the resulting heated grains from said zone at a temperature between about 220° F. and about 320° F., passing the heated grains without cooling to a temperature below about 212° F. to a preheated puffing zone, sealing said puffing zone, introducing steam into said puffing zone under pressure, and suddenly releasing the pressure within said puffing zone whereby said puffing is effected.

5. In a process for puffing cereal grains in a puffing zone, the improvement which comprises preheating said grains under dehydrating conditions to a temperature above about 212° F. and then introducing the heated grains into said zone while hot.

6. A process of puffing cereal grains which comprises moving by gravity flow a compact mass of cereal grains through a heating zone, passing a hot drying gas laterally through said zone whereby said mass is heated to a temperature above about 212° F., withdrawing successive charges of heated grains from a lower portion of said heating zone, introducing each of said charges while still hot to a steam puffing zone, and then explosively puffing the grains.

7. The process recited in claim 6 wherein said cereal grains are wheat, wherein said temperature is between about 220° F. and about 320° F. and wherein the time of heating is insufficient to cause substantial scorching of the grains.

References Cited in the file of this patent

UNITED STATES PATENTS

| Number | Name | Date |
|---|---|---|
| 260,567 | Hawkenson | July 4, 1882 |
| 1,707,930 | Bennett | Apr. 2, 1929 |
| 2,008,860 | Gardner | July 23, 1935 |
| 2,116,212 | Plews | May 3, 1938 |
| 2,124,746 | Plews | July 26, 1938 |
| 2,261,456 | Warren | Nov. 4, 1941 |
| 2,264,574 | Kellogg | Dec. 2, 1941 |
| 2,279,280 | Musher | Apr. 7, 1942 |
| 2,414,185 | Andrews | Jan. 14, 1947 |
| 2,529,710 | Singh | Nov. 10, 1950 |
| 2,529,953 | Malecek | Nov. 14, 1950 |